(No Model.) 3 Sheets—Sheet 2.
H. BLACKMAN.
FURNACE FOR RECOVERING SODA.
No. 424,755. Patented Apr. 1, 1890.
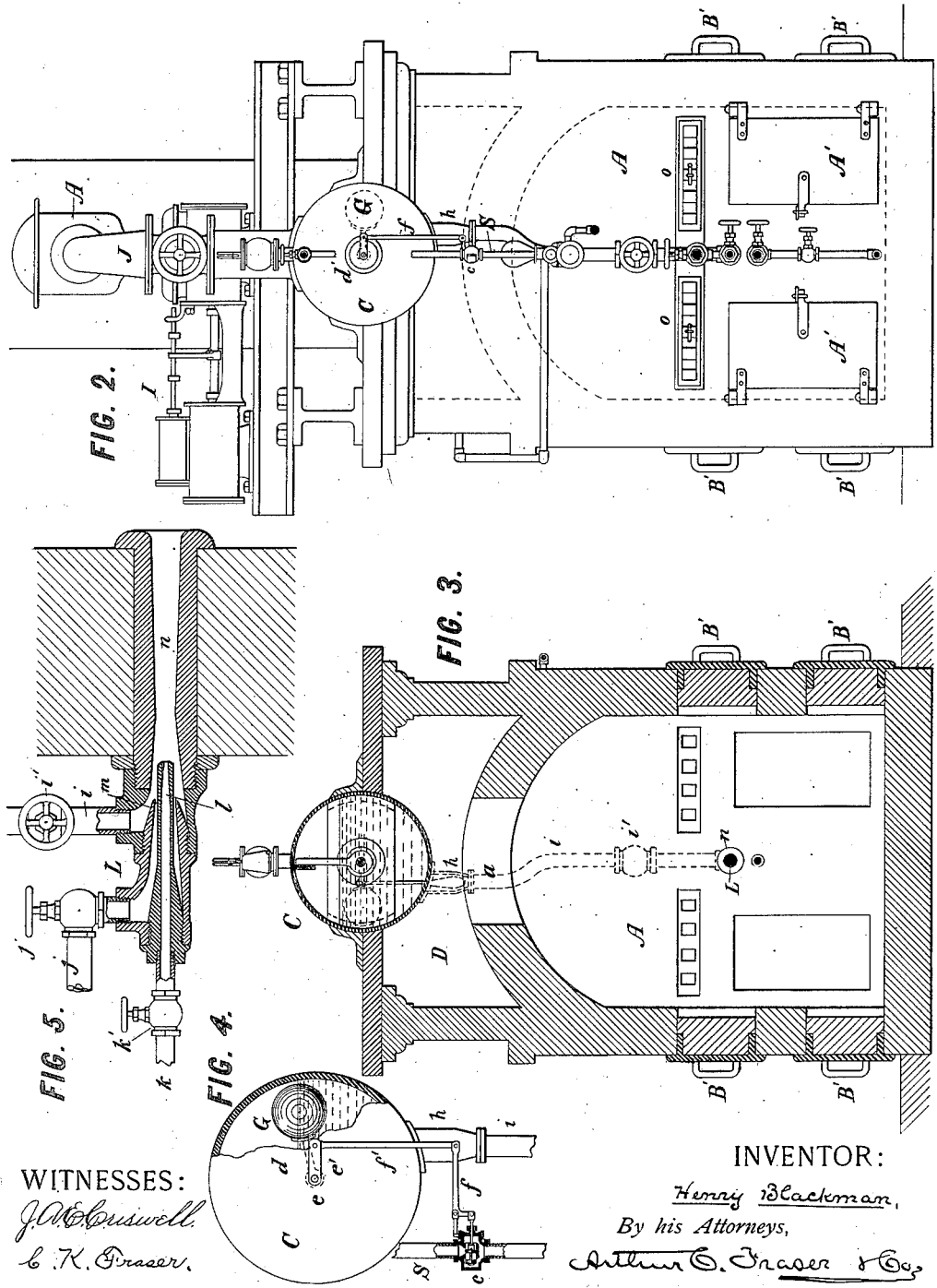
WITNESSES:
INVENTOR:
Henry Blackman,
By his Attorneys, (No Model.) 3 Sheets—Sheet 3.
H. BLACKMAN.
FURNACE FOR RECOVERING SODA.
No. 424,755. Patented Apr. 1, 1890.
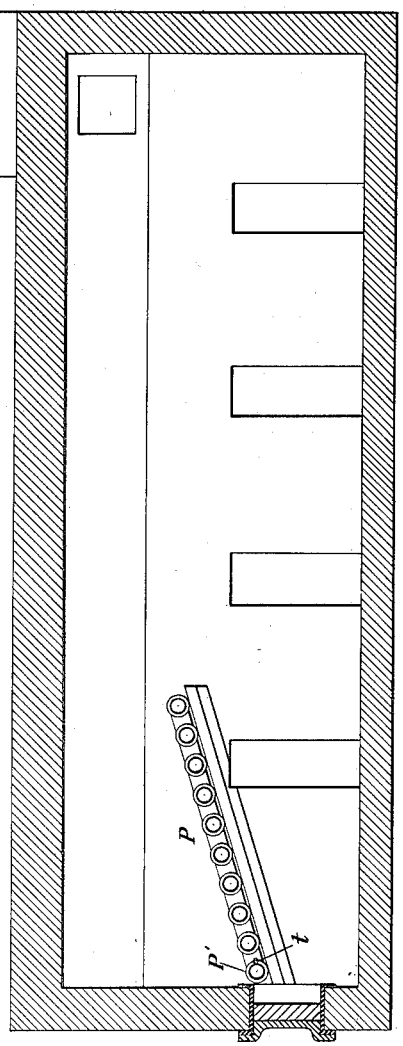
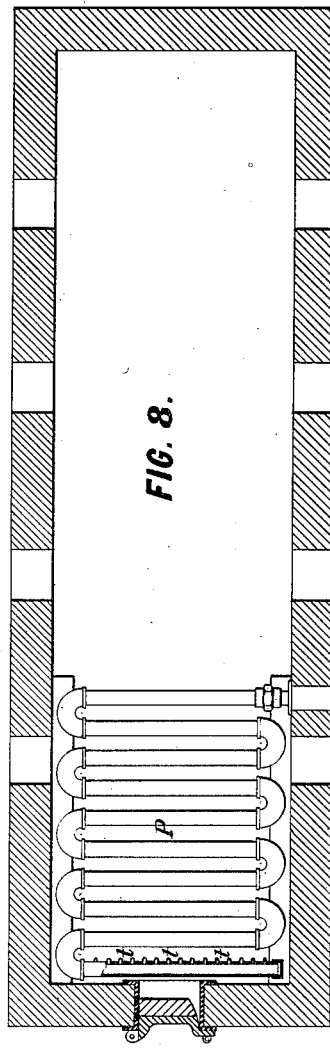
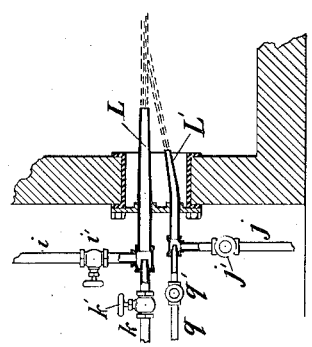
WITNESSES:
INVENTOR:
Henry Blackman,
By his Attorneys,

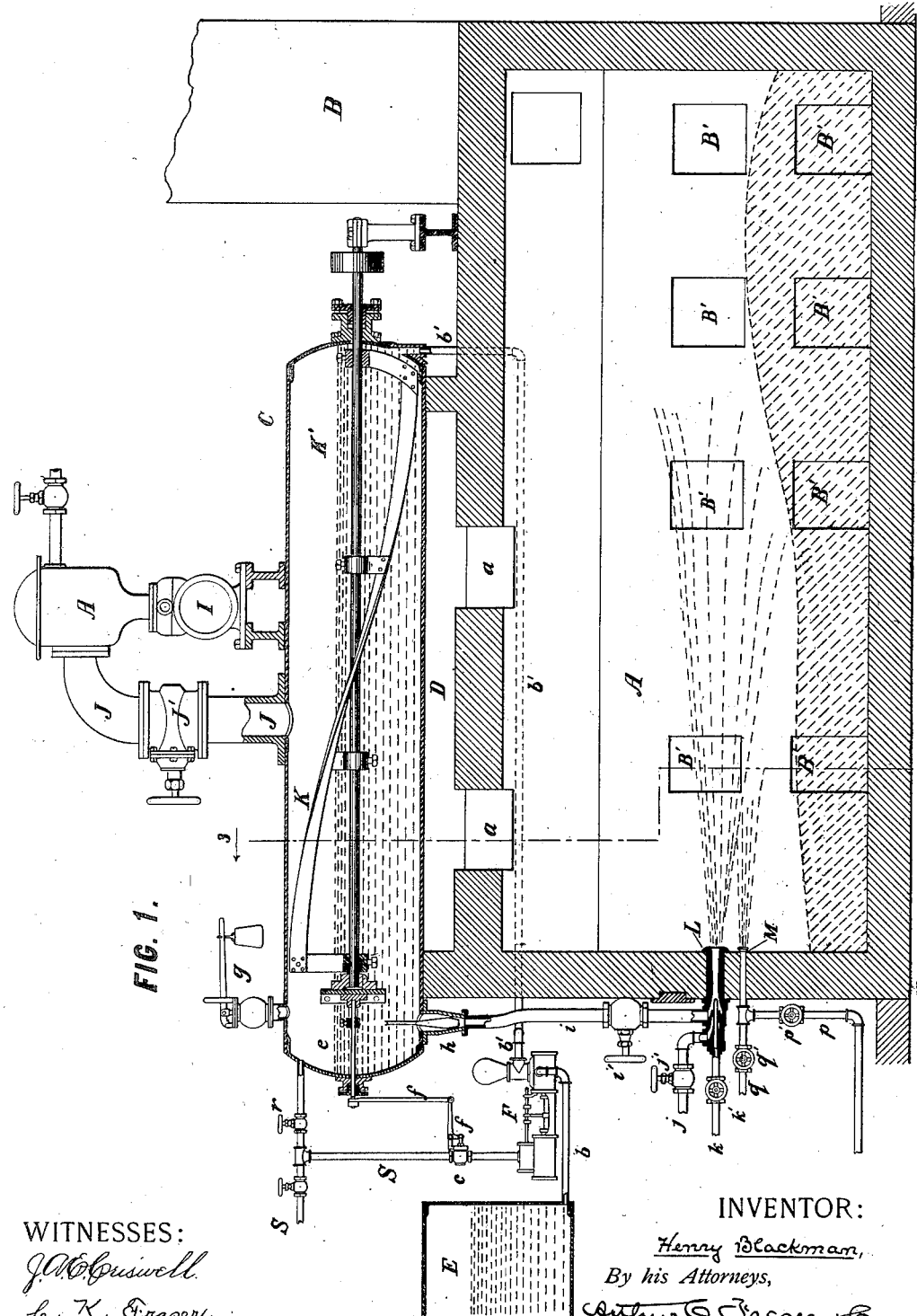

UNITED STATES PATENT OFFICE.

HENRY BLACKMAN, OF NEW YORK, N. Y.

FURNACE FOR RECOVERING SODA.

SPECIFICATION forming part of Letters Patent No. 424,755, dated April 1, 1890.

Application filed July 11, 1888. Serial No. 279,605. (No model.)

*To all whom it may concern:*

Be it known that I, HENRY BLACKMAN, a citizen of the United States, residing in the city, county, and State of New York, have invented certain new and useful Improvements in Furnaces for Evaporating and Calcining Alkaline Solutions, &c., of which the following is a specification.

In the recovery of alkalies, lime, and other substances from solution it is customary to resort to calcination in a furnace, in order to expel every particle of water and reduce the substance to anhydrous condition. The calcining process has an important application in the reclaiming of soda or other chemicals from the spent liquors of pulp-digesters.

My invention provides an improved furnace and its accessories for use in that process of calcination in which the soda-liquor or other material to be treated is injected into the furnace through a blast-nozzle and by means of a gaseous or vaporized blast, so that it is subdivided or atomized fuel, in gaseous or liquid form being simultaneously injected either through the same or a separate nozzle, in order that the atomized liquid shall mingle within the furnace with the burning fuel and be subjected to the most intense heat resulting from the combustion, so that it is vaporized, and the water or other volatile substance contained in the solution is expelled, the soda or other refractory ingredient or ingredients of the solution falling to the bottom of the furnace.

My invention provides several improvements designed to facilitate and improve the operation of furnaces for calcining by this process.

Figure 1 of the accompanying drawings is a vertical longitudinal mid-section of my improved calcining apparatus in its preferred form. Fig. 2 is an end elevation thereof looking from the rear. Fig. 3 is a transverse section thereof cut in the plane of the line 3 3 in Fig. 1, and looking from the front. Fig. 4 is an enlarged fragmentary rear elevation of the concentrating-vessel, partly in section, with a side elevation of the steam-valve controlled thereby, also partly in section. Fig. 5 is an enlarged vertical mid-section of the compound-injector through which the streams of alkaline solution, fuel, and air or steam are injected into the furnace. Fig. 6 is a fragmentary vertical section of the rear end of the furnace shown in Fig. 1, provided with a modified construction of injector. Fig. 7 is a vertical longitudinal mid-section of a modified construction of furnace, and Fig. 8 is a horizontal section thereof. Fig. 9 shows a modification of Fig. 6.

I will first describe the construction of furnace shown in Figs. 1 to 5, inclusive.

Let A designate the furnace proper or combustion or calcining chamber, which is built of masonry by preference and of any suitable dimensions and proportions and is provided with a stack or chimney B. Over the furnace is a concentrating-vessel C, which is built into and supported by the masonry, the construction of the latter being such that a heating or reverberatory chamber D is formed over the arched roof of the furnace, into which chamber the vessel C projects, and which chamber is heated from the furnace A by the passage of hot gases into it through openings $a\,a$, formed in the arched roof of the furnace.

The spent liquor to be recovered, or other solution to be treated, is contained in a vat or reservoir E, Fig. 1, from which it is forced by a steam-pump F into the vessel C, the liquid passing through a pipe $b$ to the pump and from the pump by a pipe $b'$ to the vessel C. The pump F is operated by steam taken from a pipe S, Figs. 1, 2, and 4, connected with a suitable steam-supply, and the flow of steam to the pump is governed by a valve $c$, which is opened and closed by the movement of a float G, Figs. 2 and 4, in the vessel C. When the liquid accumulates in the vessel C to so high a level as to raise the float G above its normal position, the valve $c$ is closed, thereby cutting off the supply of steam to the pump F, and thereby stopping the pumping operation until by a fall in the level of liquid in the vessel C the descent of the float again opens the valve. Any suitable connecting mechanism may be interposed between the float G and the valve $c$. The particular mechanism shown consists of an arm $d$, to which the float is fixed and which is fastened to a rock-shaft $e$, which passes out through a stuffing-box at the end of the vessel C and has a crank $e'$ on its end, which connects by a pitman $f'$ to an elbow-lever $f$, to which lever the valve-stem is connected, as clearly shown in Fig. 4.

The concentrating-vessel C, having been filled with the spent liquor or solution from the tank E, as described, is heated by the circulation in the chamber D of the hot gases from the furnace, and thereby serves to evaporate the water from the liquor. The vapors disengaged in this vessel are preferably drawn off by an air-pump after the method common in vacuum-pans. For this purpose I provide a condenser H and an air-pump I, communicating with the vessel C through the medium of a suction-pipe J, in which is a valve $J'$. By opening this valve and setting the pump and condenser in operation in the manner well known to those familiar with vacuum-pans the vapors disengaged in the vessel C are continuously drawn therefrom and a partial vacuum is maintained therein. Thus the concentration of the liquor is facilitated.

In order to prevent the caking or incrustation on the interior of the walls of the vessel C of alkaline or other matters precipitated from the liquor during concentration, I provide a stirring or scraping device consisting of a blade K, arranged spirally within the vessel C and mounted on arms projecting from a rotary shaft $K'$, mounted in bearings concentrically within the vessel and passing out through a stuffing-box at one end thereof, where it is provided with a pulley through which to transmit movement to it. The blade K is arranged to scrape against the inner surface of the wall or shell of the vessel C as it is carried around by the rotation of the shaft $K'$, thus continuously scraping off any accumulation of solid matter that may form. This rotary blade also acts to agitate the liquid and keep it continually stirred up and to prevent the formation of precipitate.

When the mass of solution in the concentrating-vessel C has been reduced to the requisite density, the vacuum-valve $J'$ may be closed and the operation of the pump and condenser discontinued, in order to restore the contents of the vessel C to the normal pressure or even if desired to accumulate a pressure therein up to any preferred degree. The limit of this pressure will be determined by a safety-valve, such as the one shown at $g$ in Fig. 1. The calcining operation may then be commenced. The solution passes out of the concentrating-vessel C through a valve $h$ and pipe $i$ to the injector L. The outflow of the solution is regulated by the valve $h$, which receives motion from the float G, its stem $h'$ being jointed to the lever $d$ of the float. Thus the descent of the float G closes the valve $h$ and shuts off the outflow, while the ascent of the float opens the valve and affords a free outflow. The object of this construction is to keep the liquid in the vessel C at a level sufficient to protect its sides from burning out. This automatic outlet is chiefly useful in case of a continuous concentrating operation when the liquor enters the vessel C at one end and is concentrated during its flow through the latter and passes out at the opposite end. For an intermittent concentrating operation it may be dispensed with.

The injector L is best shown in Fig. 5. It consists of a shell constructed in as many sections as may be convenient and formed internally with nozzles, through which the streams of alkaline solution, fuel, and air or steam may enter. The alkaline solution enters through the pipe $i$ and its flow is governed by a valve $i'$. The fuel, which I will assume to be natural gas, enters by the pipe $j$, and its flow is controlled by the valve $j'$. The air or steam enters by the pipe $k$ and is governed by the valve $k'$. I have shown the injector as provided with a long nozzle $l$, through which the steam or air entering by the pipe $k$ is injected, and with an annular nozzle $m$, formed around this nozzle $l$ and through which the gaseous fuel is discharged; and I have shown a passage for the admission of the alkaline solution, extending around the tip of this annular nozzle, as will be clearly seen in Fig. 5. The injector-nozzles are coupled to a tube or tuyere $n$, which is bedded permanently in the front wall of the furnace.

The operation of the injector will vary according to circumstances. In case natural gas is used and is supplied at a high pressure, the gas may be introduced either through pipe $j$, as described, or through pipe $k$, as preferred; and the force of the blast of gas will be sufficient to draw in the alkaline solution through the pipe $i$, and also to draw in any desired proportion of air through the pipe $k$ or $j$, as the case may be; or air may be admitted and mixed with the gas before the latter is introduced to the injector, in which case it will not ordinarily be necessary to introduce air into the injector. Whenever the pressure of gas is insufficient to provide the motive power for forcing the requisite blast into the furnace, steam or compressed air will be introduced through the pipe $k$, (or $j$, if preferred,) the pressure of the steam or air being sufficiently high to produce as forcible a blast as may be required. If steam is used, it is preferable that it be superheated. If the alkaline solution is under pressure in the vessel C, this pressure will aid in giving force to the blast, and it is possible to apply a sufficient pressure to this solution to enable it to contribute very largely to the force with which it is injected. It is important, however, that there shall be a sufficiently-powerful blast of gas or air or steam to minutely subdivide the alkaline solution, in order that it shall enter the furnace in the form of spray like that delivered from an atomizer.

The preferred method of working is to simultaneously inject gas and air, one or the other of which should be under high pressure, in order to effect the requisite atomization of the alkaline solution. The relative proportions of air, gas, and solution that are admitted will be determined by the valves $j'$, $k'$, and $i'$, respectively. The proper conditions and proportions being found and maintained, a powerful blast of commingled air, gas, and solution will be projected into the furnace and will traverse the furnace in the direction of its length, in order to afford a sufficiently-long time for the action upon the solution to take place. The blast is ignited instantly upon its entrance into the furnace, and the intense heat caused by the combustion of the gas causes it to volatilize the water contained in the solution and convert it into steam, and thereby to separate it and also to simultaneously separate with it the other volatile constituents of the solution from the non-volatile and non-combustible or refractory constituents thereof—such, for example, in the case of an alkaline solution, as the soda or potash. The intense heat also burns up all the combustible impurities, thereby leaving the soda or potash substantially pure. The alkaline matter as it is thus recovered from the solution drops in the form of flakes or fine particles to the floor or hearth of the furnace, and if it has not already been wholly deprived of moisture its treatment is completed while lying upon the hearth by the expulsion from it of all moisture, owing to the intense heat emanating from the flames playing above it, whereby it is rendered completely anhydrous. When the operation has continued long enough to accumulate a suitable quantity of calcining alkali upon the hearth of the furnace, the injection may be discontinued and the alkali be removed from the furnace by opening the doors B' B' in the sides thereof, through which it may be shoveled out; or the material may be removed from time to time or continuously during the operation of the furnace and without suspending the injection by opening the lower doors only, which are beneath the level to which the mass has accumulated, and shoveling or raking out the the material from the bottom of the pile.

It is desirable to avoid opening the side doors far enough to admit cold air into the furnace during the calcining operation, as thereby the temperature would be considerably lowered and the operation proportionally retarded.

By the simultaneous injection of the solution to be treated and the fuel the two are intimately commingled, and the solution, being finely subdivided or atomized by the injection, is subjected to the most intense heat that is generated within the furnace, since it is carried along with the fuel, the combustion of which generates the heat. By also injecting air to maintain the combustion simultaneously with the fuel and the solution to be treated the fuel is caused to ignite instantly and to burn throughout the whole of the projected blast. This injection of air, however, is not essential, as air may be admitted to the furnace through the dampers in the usual manner. I prefer, however, to introduce air both by injection and by admitting it through dampers. To provide for the latter admission, the furnace is constructed with air-registers $o$ $o$, Fig. 2, in its front. It is also constructed with front doors A' A', which may also be provided with register-openings, but which are intended principally as a means for gaining access to the interior of the furnace.

In order to ignite the injected blast and to maintain it ignited in case from any cause—such, for example, as the momentary cessation of pressure—it should become extinguished, I provide a supplemental injector M, arranged, preferably, beneath the injector L. This injector M is fed with gas from a pipe $p$ and with air or steam from a pipe $q$, the flow being controlled by the valves $p'$ and $q'$ in the respective pipes. The smaller blast from this injector meets the blast from the injector L when the latter has passed some distance into the furnace and serves not only for the ignition thereof, but also is useful, in that it increases the heat to which the solution is subjected and in that it intercepts the falling flakes of alkaline matter and advances their calcination.

As before stated, the concentrating operation in the vessel C may be continuous, in which case either, first, a partial vacuum may be maintained in the vessel by means of the pump and condenser, or, second, the vessel may be open to the outer air, so as to maintain its contents at atmospheric pressure, or, third, the concentration may be carried on under some degree of pressure, as may be determined by the setting of the safety-valve $g$. In the first case the force of the blast through the injector L must be sufficient to draw down the solution against atmospheric pressure, tending to force it up through the pipe $i$ and back into the vessel C. In the second case the weight of the column of liquid in the vessel C and pipe $i$ will assist the injection; but necessarily the evaporation in the vessel C will be less rapid, and consequently the solution will ordinarily be injected to the furnace at a less density. In the third case the pressure will assist the outflow of the liquid to the injector, but will still further retard the concentrating operation. Either of the three methods may be adopted, according to the judgment of the operator and the character of the liquid being treated and other varying conditions. If a higher pressure is desired in the vessel C than is produced by the retention of the disengaged vapor or steam therein, it may be attained by admitting steam from the pipe S through the cock $r$, Fig. 1.

My invention may be operated and in large part availed of without actually commingling the alkaline or other solution with the fuel before their injection into the furnace, provided that their injection is simultaneous and they are caused to thoroughly commingle in the blast within the furnace. Fig. 6 shows a furnace constructed for such operation. The front of the furnace is provided with two injectors L and L'. The injector L communicates with the pipe $i$, through which the solution passes, and the pipe $k$, through which the steam enters, the force of the jet of steam serving to draw in the solution and to subdivide or atomize it and to inject it forcibly into the furnace. The injector L' is in connection with a fuel-pipe $j$ and a steam or compressed-air pipe $q$, having the valves $j'$ and $q'$, respectively. The pipe $j$ may lead from a tank of petroleum or other combustible liquid, which is drawn into the injector and subdivided or atomized by the force of the jet of air or steam entering through the pipe $q$. The two injectors are so directed that the blasts issuing from them intersect within the furnace, whereby the subdivided fuel and the subdivided alkaline solution become intimately commingled in the combined blast. Gaseous fuel might be admitted through the pipe $j$, or it might enter through the pipe $q$, and, if under sufficient pressure, might serve to draw in the air through the pipe $j$. If sufficient air to maintain combustion is not admitted through one or the other of the injectors, it must be admitted independently through dampers or registers.

Figs. 7 and 8 show a furnace in which the combined blast of fuel, solution, and air is superheated after leaving the combining-injector and before being discharged into the furnace. This superheating is effected by a coil P, suitably arranged within the furnace, which connects at one end with the injector L and at the other end terminates in a series of tuyeres or nozzles $t\,t$, which are best applied in a row to the last section of pipe P' of the coil. The sprayed or subdivided liquid is carried through the coil of pipes by the blast of gas and air or steam at a high velocity, and during its passage is subjected to the heat of the furnace, which is transmitted to it through the pipes, and upon its emerging at the tuyeres $t\,t$ it takes fire and burns beneath the coil of pipe P in a number of small jets or blasts, which are ejected at high pressure, and which, merging together, form a sheet of flame extending longitudinally of the furnace and for nearly or quite its entire length. The operation is precisely the same as in the construction first described, except that by reason of the superheating of the blast the commingling of the alkaline solution and the fuel and air or steam is more intimately effected, and the temperature of the blast is raised so that the ignition of the fuel takes place instantly upon its admission to the furnace.

It is not strictly necessary to my invention that the alkaline solution and the fuel shall be actually commingled in the blast, as my invention may be in part availed of by the employment of two blasts—one of the solution projected in a state of spray by means of a powerful current of air or superheated steam and the other of the fuel mixed with air to maintain combustion. The fuel-blast is preferably placed directly beneath the blast of the atomized liquid, so that the particles of liquid or of alkaline matter falling from the upper blast will be compelled to fall through the lower blast and be thereby subjected to the most intense heat thereof, in order to effect or complete the evaporating and calcining process.

Fig. 9 shows a construction for carrying out the method just described. It is substantially similar to that shown in Fig. 6, except that the two injectors L L' are directed parallel with each other instead of converging. The liquid to be treated will enter through the pipe $i$ and superheated steam through the pipe $k$, or compressed air may be admitted through the latter pipe. Fuel will enter through the pipe $j$ and preferably compressed air through the pipe $q$, although superheated steam might be substituted in the latter pipe. Preferably the nozzles should throw a blast in the form of a horizontal sheet, so that the upper blast of atomized liquid will be projected over a continuous sheet of flame fed by the lower blast.

In this specification I have referred to the parts L and M as "injectors." It will be understood, however, that it is not essential to my invention that these parts should be "injectors" in the sense in which the term is most commonly understood—viz., in that one fluid shall be drawn or forced in by the inductive effect of another fluid moving under suitable pressure or a high velocity. In lieu of this the contents of each pipe may be under sufficient pressure to be thereby projected into the furnace with the requisite velocity; hence it is only essential that the several fluids shall enter the furnace through suitable blast nozzles or tuyeres.

It will be understood that my apparatus is not limited in its application to the exact process herein described, nor to the treatment of the substances herein named, it being in fact applicable for the reclaiming of all refractory substances which are in solution or mixed with volatile or combustible substances, provided only that the substance to be treated is capable of being conducted or of flowing through a pipe or passage to the point where it is injected. To this end it must be in fluid form, or, if solid, in a finely-comminuted condition.

My apparatus may be used in the extraction of salt from brine, in recovering lime from lime water or cream, in the manufacture of soda and potash, and for various other purposes.

For the manufacture of soda (sodium carbonate) from salt cake (sodium sulphate) by the Leblanc method my apparatus is also applicable. In this case and in other instances to which my invention is applicable two or more substances mixed together are injected into the furnace, and the heat effects a reaction by which a new compound is formed, and certain constituents pass off through the furnace.

I claim as my invention the several novel features or improvements in or applicable to apparatus for reclaiming refractory substances from solution or mixture, and other analogous apparatus, defined as follows, substantially as hereinbefore specified, viz:

1. The combination, with a furnace, of an injector entering said furnace, a pipe leading from a source of fuel and entering said injector, a pipe leading from a source of liquid to be treated and entering said injector, whereby the combined blast of liquid and fuel is injected into the furnace, and a supplemental injector entering the furnace, with a fuel-pipe leading thereto, whereby a jet of flame is injected into the furnace in position to ignite the blast from the main injector.

2. The combination, with a furnace, of a closed concentrating-vessel or vacuum-pan arranged to be heated by the furnace, air-exhausting mechanism for producing a partial vacuum in said concentrator, an outlet-pipe leading from said concentrator, an injector entering the furnace and communicating with said pipe, and a pipe leading from a source of gaseous or vaporous fluid under pressure and entering said injector.

3. The combination, with a furnace, of a concentrating-vessel, an agitator in said vessel, the outlet-pipe from said vessel, and an injector entering the furnace and communicating with said outlet-pipe.

4. The combination, with a furnace, of a concentrating-vessel of circular cross-section, a rotative shaft mounted concentrically in said vessel, and a scraping or agitating blade mounted on said shaft within said vessel, an outlet-pipe from said vessel, and an injector entering the furnace and with which said outlet-pipe communicates.

5. The combination, with the concentrating-vessel, of a steam-pump for forcing the liquid under treatment into said vessel, a float in said vessel, a valve in the steam-pipe leading to said pump, and mechanical connections interposed between said valve and float, whereby the rise or fall of the float closes or opens said valve.

6. The combination, with a furnace, a concentrating-vessel, an outlet-pipe therefrom, and an injector communicating with said pipe and entering the furnace, of an automatic float-valve for governing the outflow from the vessel through said outlet-pipe.

In witness whereof I have hereunto signed my name in the presence of two subscribing witnesses.

HENRY BLACKMAN.

Witnesses:
ARTHUR C. FRASER,
GEORGE H. FRASER.